(12) United States Patent
Freudenstein et al.

(10) Patent No.: US 10,882,548 B2
(45) Date of Patent: Jan. 5, 2021

(54) STOWABLE STEERING COLUMN APPARATUS

(71) Applicant: STEERING SOLUTIONS IP HOLDING CORPORATION, Saginaw, MI (US)

(72) Inventors: Thomas A. Freudenstein, Saginaw, MI (US); Melvin L. Tinnin, Clio, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 171 days.

(21) Appl. No.: 16/163,077

(22) Filed: Oct. 17, 2018

(65) Prior Publication Data

US 2019/0111960 A1    Apr. 18, 2019

Related U.S. Application Data

(60) Provisional application No. 62/573,391, filed on Oct. 17, 2017.

(51) Int. Cl.
*B62D 1/181* (2006.01)
*B62D 1/185* (2006.01)
*B62D 1/183* (2006.01)

(52) U.S. Cl.
CPC ............. *B62D 1/181* (2013.01); *B62D 1/183* (2013.01); *B62D 1/185* (2013.01)

(58) Field of Classification Search
CPC ........ B62D 1/183; B62D 1/181; B62D 1/185; B62D 1/187; B62D 1/189
USPC ...................................................... 280/777
See application file for complete search history.

(56) References Cited

U.S. PATENT DOCUMENTS

| 2,769,351 | A | * | 11/1956 | Serfling | ................. | B62D 1/181 |
| | | | | | | 74/493 |
| 2,836,988 | A | * | 6/1958 | Cashman | ............... | B62D 1/181 |
| | | | | | | 74/493 |
| 4,445,708 | A | * | 5/1984 | Oakes | .................... | B62D 1/192 |
| | | | | | | 180/78 |
| 4,691,587 | A | * | 9/1987 | Farrand | ................. | B62D 1/181 |
| | | | | | | 280/775 |
| 4,805,478 | A | | 2/1989 | Beauch | | |
| 5,193,848 | A | * | 3/1993 | Faulstroh | ............... | B62D 1/181 |
| | | | | | | 280/775 |
| 5,690,362 | A | * | 11/1997 | Peitsmeier | ............. | B62D 1/181 |
| | | | | | | 280/775 |

(Continued)

FOREIGN PATENT DOCUMENTS

CN        101939205 A    1/2011
CN        102099238 A    6/2011

(Continued)

OTHER PUBLICATIONS

English translation of first Office Action regarding corresponding CN App. No. 201811210284.1; dated Oct. 12, 2020.

*Primary Examiner* — Ruth Ilan
(74) *Attorney, Agent, or Firm* — Dickinson Wright PLLC

(57) ABSTRACT

A steering column apparatus includes a telescoping column assembly and a stowing assembly. The telescoping column assembly includes a lower jacket and an upper jacket. The upper jacket is adapted to move between extended and retracted positions along a telescope axis and with respect to the lower jacket. The stowing assembly is engaged to the lower jacket, and is adapted to move between stowed and un-stowed states along a stow axis.

5 Claims, 6 Drawing Sheets

(56) References Cited

U.S. PATENT DOCUMENTS

| | | | |
|---|---|---|---|
| 5,911,789 A * | 6/1999 | Keipert | B62D 1/181 280/775 |
| 7,793,980 B2 * | 9/2010 | Fong | B62D 1/197 280/775 |
| 9,327,756 B2 | 5/2016 | Rauber et al. | |
| 10,421,475 B2 * | 9/2019 | Derocher | B62D 1/185 |
| 10,421,476 B2 * | 9/2019 | Rouleau | B62D 1/181 |
| 10,640,139 B2 * | 5/2020 | Derocher | B62D 1/181 |
| 2011/0041642 A1 | 2/2011 | Havlicek | |
| 2013/0075190 A1 * | 3/2013 | Toyoda | B62D 1/181 180/444 |
| 2014/0305252 A1 * | 10/2014 | Mizuno | B62D 1/187 74/493 |
| 2015/0375768 A1 * | 12/2015 | Fevre | B62D 1/181 74/493 |
| 2016/0318540 A1 * | 11/2016 | King | B62D 1/183 |
| 2016/0362126 A1 * | 12/2016 | Lubischer | B62D 1/183 |
| 2016/0368522 A1 * | 12/2016 | Lubischer | B62D 1/105 |
| 2016/0375928 A1 * | 12/2016 | Magnus | B62D 1/181 74/493 |
| 2017/0029009 A1 * | 2/2017 | Rouleau | B62D 1/183 |
| 2018/0050720 A1 * | 2/2018 | King | B62D 1/184 |
| 2018/0072339 A1 * | 3/2018 | Bodtker | B62D 1/183 |
| 2018/0079441 A1 * | 3/2018 | McKinzie | B62D 1/183 |
| 2018/0086378 A1 * | 3/2018 | Bell | B62D 15/02 |
| 2018/0134308 A1 * | 5/2018 | Derocher | B62D 1/183 |
| 2018/0141581 A1 * | 5/2018 | Kato | F16H 25/20 |
| 2018/0319420 A1 * | 11/2018 | Huber | F16H 25/24 |
| 2018/0370558 A1 * | 12/2018 | Buzzard | B62D 1/183 |
| 2018/0370559 A1 * | 12/2018 | Swamidason | B62D 1/181 |
| 2019/0016365 A1 * | 1/2019 | Swamidason | B62D 25/14 |
| 2019/0061803 A1 * | 2/2019 | Inoue | B62D 1/189 |
| 2019/0185041 A1 * | 6/2019 | Shin | B62D 1/184 |
| 2019/0210633 A1 * | 7/2019 | Derocher | B62D 1/183 |
| 2020/0039563 A1 * | 2/2020 | Cana | B62D 1/185 |
| 2020/0070868 A1 * | 3/2020 | Patel | B62D 1/286 |
| 2020/0101998 A1 * | 4/2020 | Nishimura | B60N 2/0244 |
| 2020/0172145 A1 * | 6/2020 | Hirschfeld | B62D 1/183 |

FOREIGN PATENT DOCUMENTS

| | | | | |
|---|---|---|---|---|
| CN | 204895553 U | | 12/2015 | |
| DE | 102015216326 A1 | * | 6/2016 | B62D 1/183 |
| DE | 102015224602 A1 | * | 6/2017 | B62D 1/181 |
| JP | 2003341528 A | | 12/2003 | |

* cited by examiner

STOWABLE STEERING COLUMN APPARATUS

BACKGROUND

The present disclosure relates to a steering column apparatus, and more particularly, to a telescoping steering column apparatus capable of being stowed.

Steering column assemblies for vehicles are known to include various adjustment devices that permit an operator to selectively position and secure the steering column in any one of a variety of positions. Such adjustment devices may include a rake device that facilitates tilting of the steering column and a telescopic device that facilitates the length of the column which generally dictates how close a steering wheel is positioned to the operator (i.e., extended position) and/or how close to the instrument cluster of the automobile (i.e., retracted position). In general, length and tilt adjustments of the steering column are made available for operator comfort while manually maneuvering the vehicle.

Current vehicle advancements may now include autonomous vehicles where an operator may choose to manually drive or maneuver the vehicle, or direct the vehicle to generally maneuver itself during an automated operating mode. While in the automated operating mode, the steering column may not only be in the retracted position, but may also be in a stowed position. Unfortunately, present steering column devices that provide movement between stowed and un-stowed positions are limited in both positioning capability and operating speed.

Accordingly, it is desirable to provide a steering column having both telescoping and stowing capability for autonomous vehicles providing a greater range of dynamic and positioning capability.

SUMMARY

A steering column apparatus for a vehicle according to one, non-limiting, exemplary embodiment of the present disclosure includes a telescoping column assembly and a stowing assembly. The telescoping column assembly is adapted to move along a steering axis between extended and retracted positions. The stowing assembly is coupled between the vehicle and the telescoping column assembly, and is adapted to move between stowed and un-stowed states along a stow axis. The telescoping column assembly is supported by the stowing assembly.

A steering column apparatus according to one, non-limiting, exemplary embodiment includes a telescoping column assembly and a stowing assembly. The telescoping column assembly includes a lower jacket and an upper jacket. The upper jacket is adapted to move between extended and retracted positions along a telescope axis and with respect to the lower jacket. The stowing assembly is engaged to the lower jacket, and is adapted to move between stowed and un-stowed states along a stow axis.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a steering column apparatus 20 of the present disclosure for a vehicle, which may be an autonomous vehicle (not shown), is capable of selective adjustment and positioning telescopically, tilt-wise (i.e., rake) positioning, and movement between stowed and un-stowed states. The steering column 20 is adapt such that motion between the stowed and un-stowed states is generally independent of motion between telescopic retracted and extended positions.

Figure 1:
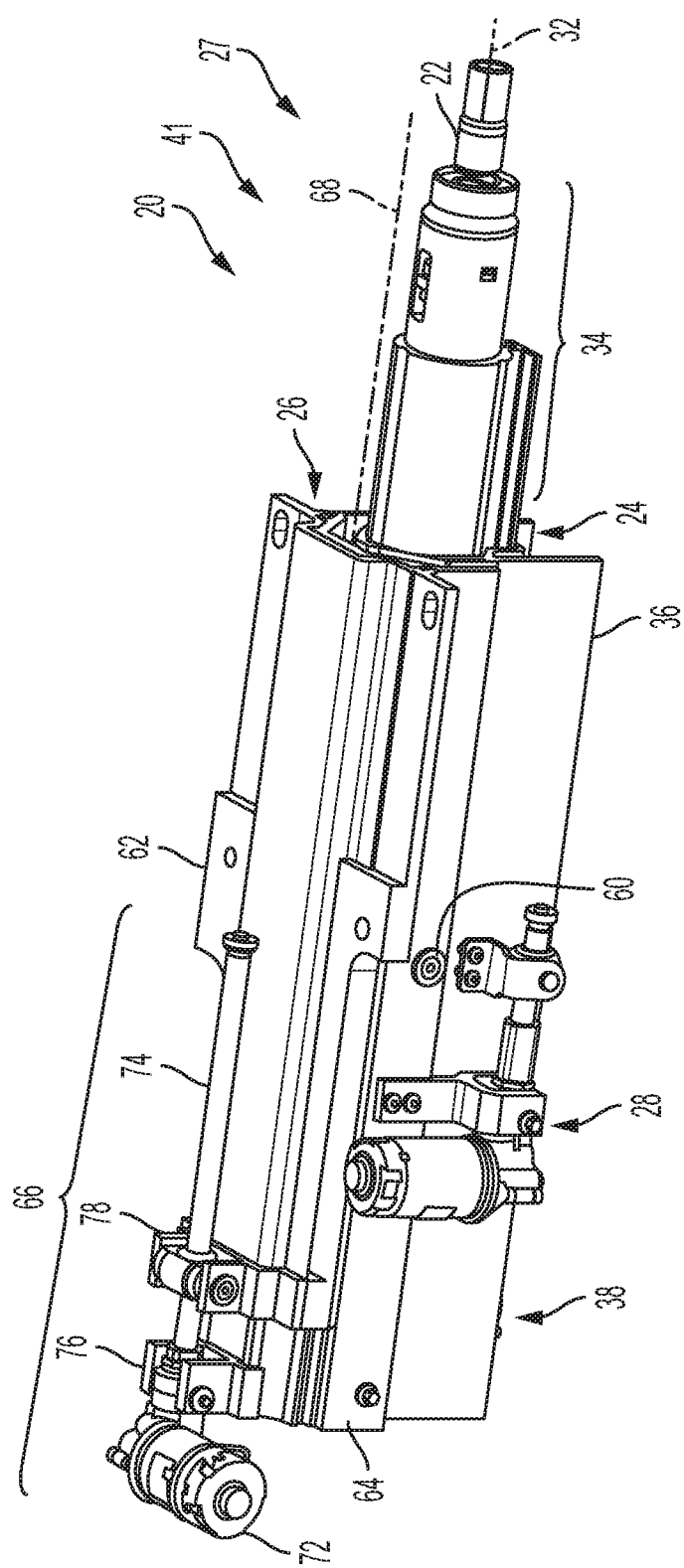
FIG. 1 is a perspective view of a steering column apparatus including a telescoping assembly in an extended position and a stowing assembly in an un-stowed state, and in accordance with an exemplary embodiment of the present disclosure.
Figure 2:
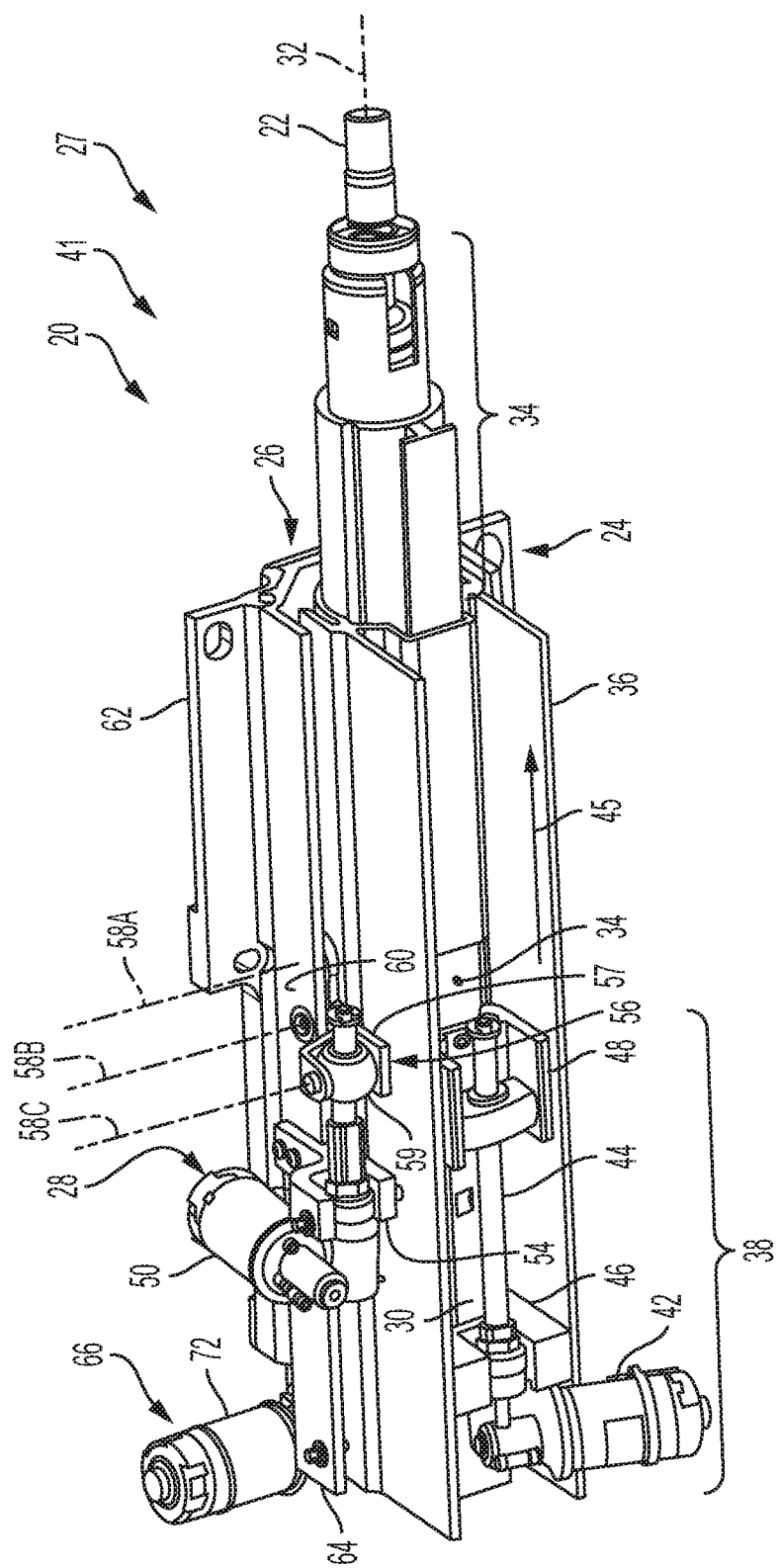
FIG. 2 is a perspective view of the steering column apparatus similar to FIG. 1 but illustrating a bottom side of the apparatus.

Referring to FIGS. 1 and 2, the steering column apparatus 20 is illustrated in a telescopic extended position (i.e., nominal position) and in a stowed state. The telescopic positioning is generally for positioning a steering wheel (not shown) based on the comfort preferences of a driver who has chosen to manually maneuver, or steer, the vehicle. When the steering column apparatus 20 is in the stowed state, the driver has chosen not to drive the vehicle manually, and instead, the vehicle is maneuvering automatically (i.e., is in an autonomous mode). Preferably, when the steering column apparatus 20 is in the stowed state, the steering wheel is generally out of the way (i.e., not within comfortable reach) of vehicle occupants.

Figure 4:
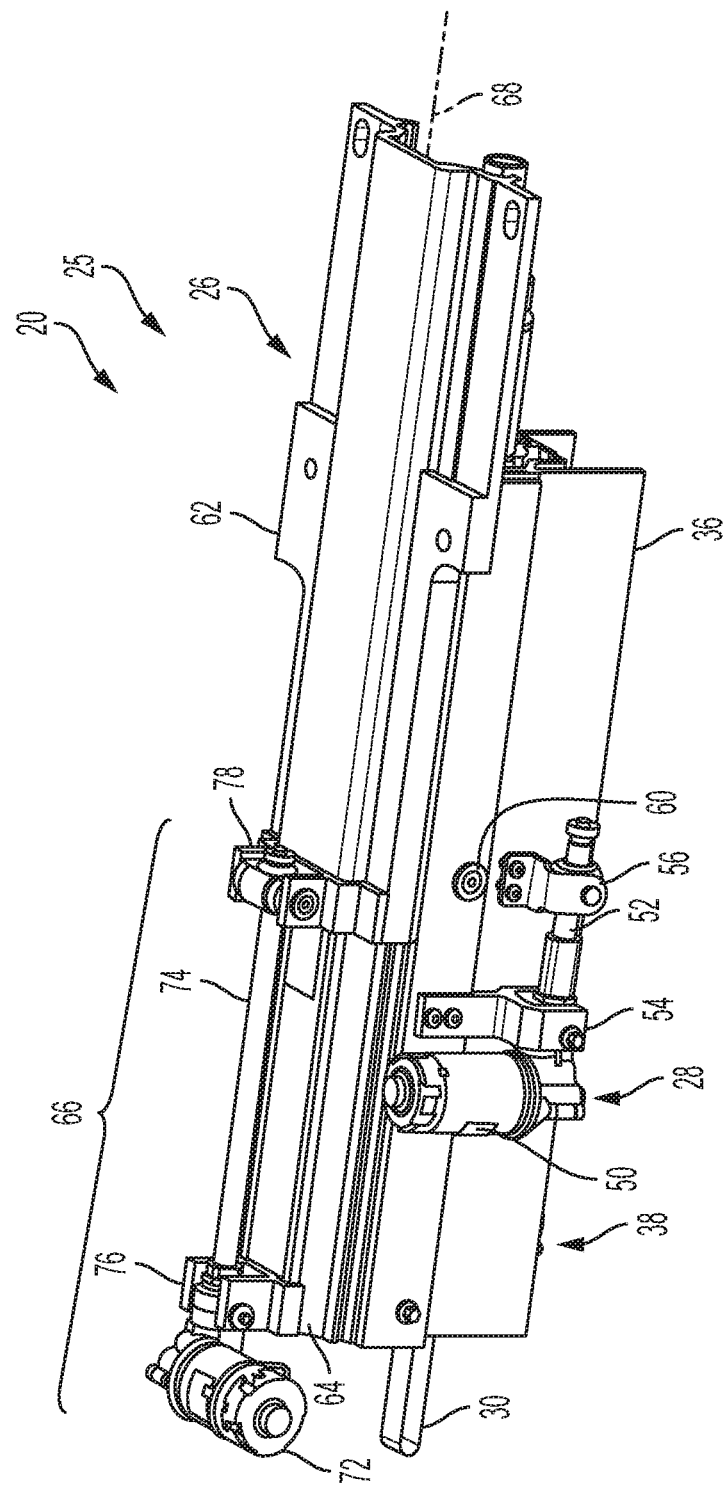
FIG. 4 is a partial perspective view of the steering column apparatus in a stowed state.

The steering column apparatus 20 may include a steering shaft 22, a telescoping column assembly 24 adapted to move between extended and retracted positions, a stowing assembly 26 adapted to move between stowed and un-stowed states 25, 27, a rake drive device 28, and an energy absorbing component or strap 30 (see FIG. 4). The steering shaft 22 is connected at one end to the steering wheel and is adapted to rotate about an axis 32. In one embodiment, the telescoping column assembly 24 is adapted to telescopically extend and retract along the axis 32 for driver convenience and comfort. The stowing assembly 26 is mounted to the vehicle and is operationally carried and coupled between the vehicle and the telescoping column assembly 24. The steering shaft 22 is rotationally supported by the telescoping column assembly 24 that is mounted to, and supported by, the stowing assembly 26.

The column assembly 24 may include an upper jacket 34, a lower jacket 36, and a telescope drive device 38 (also see FIG. 2). The upper jacket 34 is concentrically disposed about the axis 32, and the lower jacket 36 may be concentrically disposed about the upper jacket 34. The upper jacket 34 projects axially outward from the lower jacket 36 in a rearward direction with respect to the vehicle. The steering shaft 22 projects axially outward from the upper jacket 34 and in a rearward direction, for attachment to the steering wheel. The upper and lower jackets 34, 36 are constructed to axially slide with respect to one-another between the retracted position 39 (see FIG. 3) and the extended position 41 (see FIGS. 1 and 2). In one embodiment, the telescoping column assembly 24 may include a series of friction reducing bearings 40 (see FIG. 5) radially disposed between the upper and lower jackets 34, 36, with each bearing spaced circumferentially about the axis 32 (i.e., three bearings of the friction reducing bearings 40 illustrated in FIG. 5).

Referring to FIG. 2, the telescope drive device 38 of the telescoping column assembly 24 may include a drive device, or motor, 42 (e.g., electric motor), a threaded rod 44, a base bracket 46, and a shuttling bracket 48. The motor 42 may be rigidly mounted to the base bracket 46, which may be rigidly mounted to the lower jacket 36. The shuttling bracket 48 may be rigidly mounted to the upper jacket 34. The threaded rod 44 is rotationally coupled to the motor 42, may extend through the brackets 46, 48, may be threaded to the shuttling bracket 48, and extends along an axis 43. In one embodiment, the axis 43 of the telescope drive device 38 is spaced from, and is parallel too, the telescope axis 32 of the telescoping column assembly 24.

In operation, the motor 42 rotationally drives the threaded rod 44 in a first rotational direction causing the shuttling bracket 48 to ride upon and move axially along the rod in a first axial direction (see arrow 45 in FIG. 2). The threaded rod 44 rotates with respect to the base bracket 46, but is not displaced axially with respect to the base bracket. As the shuttling bracket 48 moves in the first axial direction 45, the shuttling bracket carries, or causes, the upper jacket 34 to move toward the extended position 41. Similarly, when the motor 42 rotationally drives the threaded rod 44 in an opposite rotational direction, the shuttling bracket 48 moves in an opposite axially direction along the rod 44. As the shuttling bracket 48 moves in the opposite axial direction, it causes the upper jacket 34 to move toward the retracted position 39 (see FIG. 3). It is contemplated and understood that other configurations of telescopic drive devices 38 known to one skilled in the art may be applied to the telescoping column assembly 24.

In one embodiment, the strap 30 extends between and is attached to the upper jacket 34 of the telescoping column assembly 24 and the and the shuttling bracket 48 of the telescope drive device 38 for absorbing impact energy during a crash scenario. In this example, the shuttling bracket 48 may be attached to the upper jacket 34 via the strap 30. Upon an energy absorbing impact upon the steering wheel, the strap 30 is adapted to plastically deform as the shuttling bracket 48 is back-driven upon the threaded rod 44. In other embodiments, the energy absorbing component, or strap, 30 may be coupled to, or interface with, any combination of other components as known by one skilled in the art.

Figure 5:
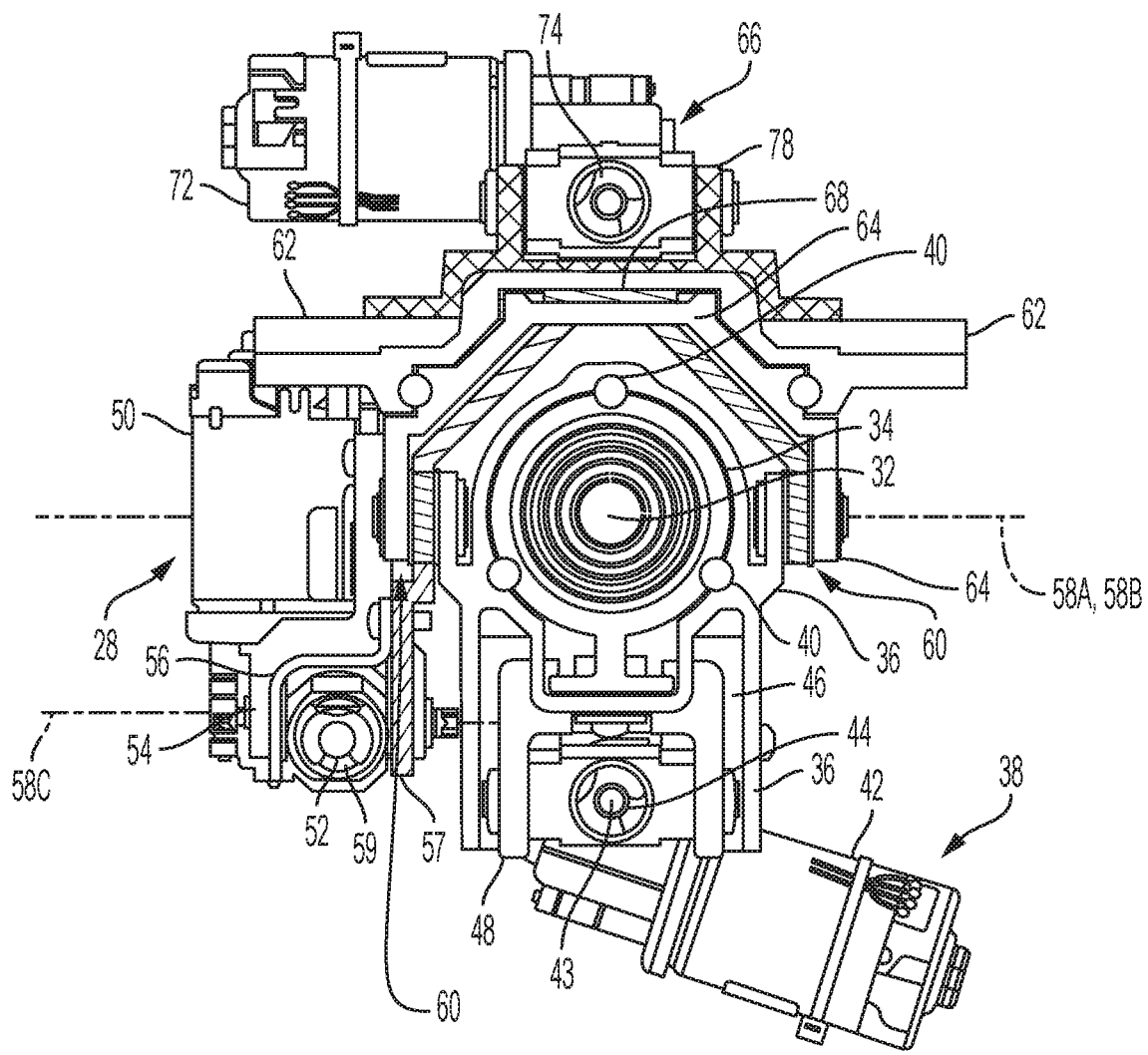
FIG. 5 is an end view of the steering column apparatus.

Referring to FIGS. 2, 4, and 5, the rake drive device 28 of the steering column apparatus 20 is constructed to generally adjust the height, or elevation, of the steering wheel with respect to the vehicle. The rake drive device 28 may include a drive component, or motor 50 (e.g., electric motor), a threaded rod 52, a base bracket 54, and a shuttle 56. The motor 50 may be rigidly mounted to the base bracket 54 that may be rigidly mounted to the sliding structure 64 of the stowing assembly 26.

In one embodiment, the shuttle 56 includes a leveraging arm 57 and a ball, or ball joint, 59 pivotally connected to the leveraging arm 57 about an axis 58C. The ball joint 59 includes a threaded hole for through-receipt of the threaded rod 52. The leveraging arm 57 is pivotally mounted to the lower jacket 36 at a first pivot axis 58A, and is pivotally connected to the sliding structure 64 at a second pivot axis 58B. The first pivot axis 58A is spaced radially from the second pivot axis 58B (also see FIG. 2) enabling the leveraging action of the arm 57. The threaded rod 52 is rotationally coupled to the motor 50, extends through the bracket 54, and threadably through the ball joint 59 of the shuttle 56.

In operation, the motor 50 rotationally drives the threaded rod 52 causing the ball 59 of the shuttle 56 to ride upon and move axially along the rod 52. As the ball 59 moves along the rod 52, the ball 59 pivots about axis 58C, and the leveraging arm 57 pivots about axis 58B. A distal portion of the leveraging arm 57 then pivots about axis 58A causing the lower jacket 36 to tilt with respect to the sliding structure 64 of the stowing assembly 26. The adjacent components of the sliding structure 64, the lower jacket 36, the leveraging arm 57, and the axes 58A, 58B, constitute a pivotal connection 60 carried between the lower jacket 36 and the stowing assembly 26 that facilitates the alteration of the height of the steering wheel with respect to the vehicle. The pivot axes 58A, 58B are substantially normal to the telescoping axis 32 and the axis 43 of the telescope drive device 38.

Figure 3:
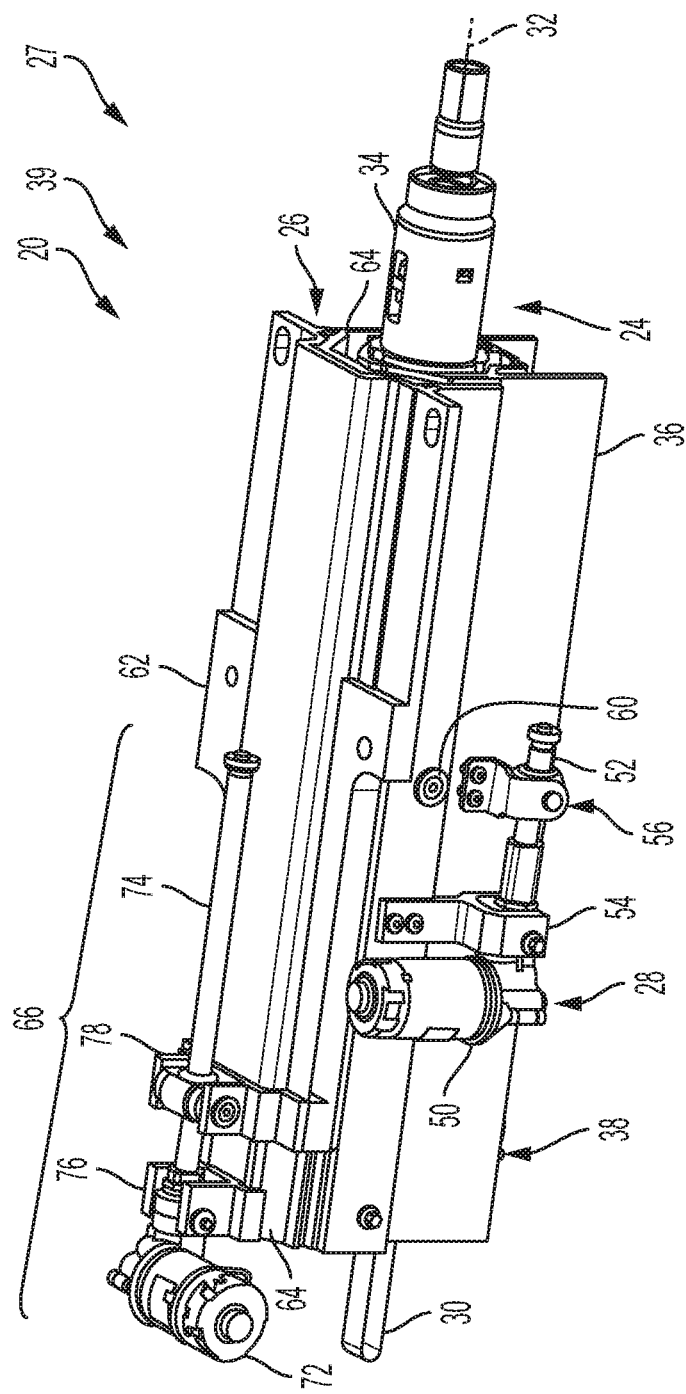
FIG. 3 is a perspective view of the steering column apparatus with the telescoping assembly in a retracted position and the stowing assembly in the un-stowed state.

Referring to FIGS. 1 through 3, the stowing assembly 26 is illustrated in the un-stowed state 27, whereas in FIG. 4, the stowing assembly 26 is illustrated in the stowed state 25. The stowing assembly 26 may include a fixed, or stationary, mounting structure or guide rack 62, a sliding structure 64, and a stow drive device 66. The guide rack 62 may be rigidly fixed to, or part of, the vehicle structure. The sliding structure 64 (e.g., analogous to a drawer slide) is supported by (e.g., suspended), and constructed to move axially along the guide rack 62 and with respect to a stow axis 68 (see FIGS. 1 and 5). In one embodiment, the base bracket 54 of the rake drive device 28 is fixed to the sliding structure 64, and the pivotal connection 60 connects the sliding structure 64 to the lower jacket 36 of the column assembly 24. As best shown in FIG. 5, the stowing assembly 26 may include a series of friction reducing bearings 70 generally disposed between the guide rack 62 and the sliding structure 64. In one embodiment, the stow axis 68 may be generally parallel to the telescopic axis 32 and the axis 43 of the telescope drive device 38. In another embodiment, the stow axis 68 may be angled with respect to the axes 32, 43.

The stow drive device 66 of the stowing assembly 26 is constructed to generally move the steering column apparatus 20 between the stowed and un-stowed states 25, 27. The stow drive device 66 may include a motor 72 (e.g., electric motor), a threaded rod 74, a base bracket 76, and a shuttling bracket 78. The motor 72 may be rigidly mounted to the base bracket 76 that may be rigidly mounted to an end portion of the sliding structure 64. The shuttling bracket 78 may be rigidly mounted to the fixed guide rack 62. The threaded rod 74 is rotationally coupled to the motor 72, may extend through the brackets 76, 78, and may be threaded to the shuttling bracket 78.

In operation, the motor 72 of the stow drive device 66 rotationally drives the threaded rod 74 causing the shuttling bracket 78 to ride upon and move axially along the rod 74. As the shuttling bracket 78 moves along the rod 74, it causes the motor 72, the base bracket 76, and the sliding structure 64 to move between the stowed and un-stowed states 25, 27 with respect to the fixed guide rack 62. As the sliding structure 64 moves between the stowed and un-stowed states 25, 27, the telescoping assembly 24 moves with the sliding structure 64 along the stow axis 68 because of the connection 60 located between the sliding structure 64 and the lower jacket 36 (see FIG. 5).

The stow drive device 66 and the telescope drive device 38 may be, at least in-part, generally independent from one-another due to the distinct, respective, motors 72, 42. In one embodiment, the drive devices 66, 38 may be capable of operating in unison thus placing the steering column apparatus 20 from an un-stowed state 27 and extended position, to a stowed state 25 and retracted position 39 relatively quickly. The stow drive device 66 may be configured to produce an axial displacement speed that is faster than an axial displacement speed of the telescope drive device 38.

In one embodiment, the sliding structure 64 may be part of the lower jacket 36. Thus the lower jacket 36 may slide into the guide rack 62 along axis 68. It is contemplated and understood that the stow and telescope function permits the same mounting points to be used as more traditional telescoping steering columns.

Figure 6:
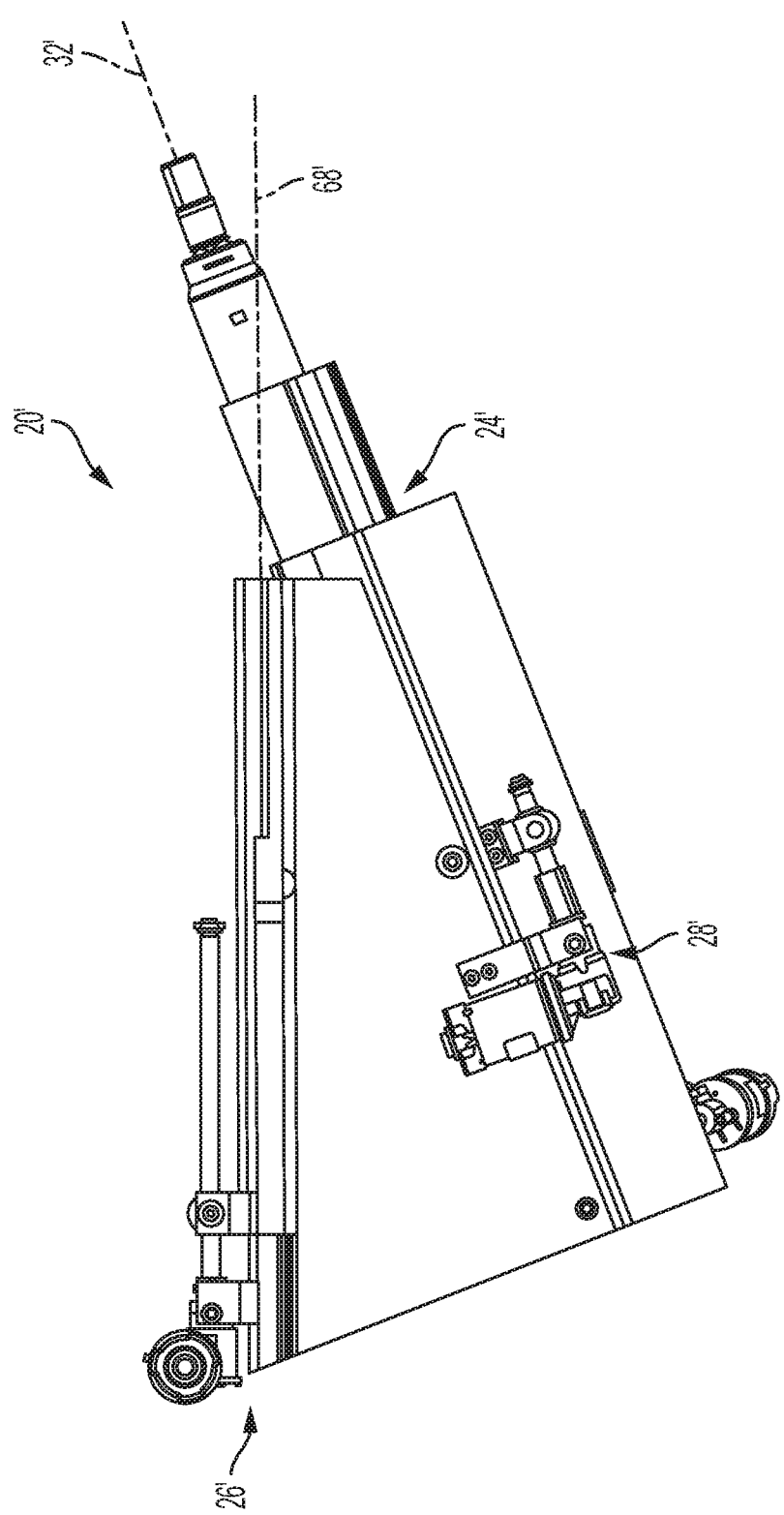
FIG. 6 is a side view of a second embodiment of the steering column apparatus.

Referring to FIG. 6, a second embodiment of a steering column apparatus is illustrated wherein like elements have like identifying numerals except with the addition of a prime symbol suffix. A steering column apparatus 20' may include a steering shaft 22', a telescoping column assembly 24', a stowing assembly 26', and a rake drive device 28'. The steering shaft 22' is connected at one end to the steering wheel and is adapted to rotate about a telescope axis 32'. In one embodiment, the telescoping column assembly 24' is adapted to axially move between retracted and extended positions along telescope axis 32'.

The stowing assembly 26', illustrated in an un-stowed state 27, may include a fixed, or stationary, guide rack 62', a sliding structure 64', and a stow drive device 66'. The sliding structure 64' is constructed to move axially along the guide rack 62' and with respect to a stow axis 68'. In this embodiment, the stow axis 68' is positioned at an angle, and may intersect, the telescope axis 32'. In one embodiment, the axes 32', 68' may lie within a common imaginary plane. Alternatively, the angle between the axes 32', 68' may be a compound angle.

Advantages and benefits of the present disclosure include a steering column apparatus having greater telescope/stow distances than more traditional columns without increasing noise, vibration, and harshness concerns due to more traditional lengthy cantilever distances. Also, because more traditional, single, telescope/stow mechanisms are generally not applied, the column mounting locations may be more rearward in the vehicle thus enabling use of pre-existing, or more common, mounting points on a vehicle platform (i.e., mounting points that may also be used for traditional, non-stowable, steering columns). Further, the present disclosure provides a stow mechanism and telescope/energy absorption mechanism that are mechanically separate from one-another, enabling the column to share common mounting points with other non-stowable columns. Yet further, the separation of the stow and telescope functions facilitates use of separate axes for stowing and for telescope/energy absorption.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the invention, it is claimed:

1. A steering column apparatus comprising:
a telescoping column assembly adapted to move along a steering axis between extended and retracted positions;
a stowing assembly adapted to move between stowed and un-stowed states along a stow axis, the telescoping column assembly being supported by the stowing assembly, wherein the stowing assembly includes a sliding structure slideably coupled to the vehicle, and the telescoping column assembly is attached to the sliding structure, wherein the telescoping column assembly includes a lower jacket attached to the sliding structure and an upper jacket, the upper jacket being adapted to move between the extended and retracted positions with respect to the lower jacket; and
a rake drive device including at least one pivotal connection carried between the sliding structure and the lower jacket, the at least one pivotal connection including respective pivot axes disposed normal to the steering axis, wherein the rake drive device includes a motor attached to the stowing assembly, a threaded rod rotationally driven by the motor, and a shuttle mounted to the lower jacket and adapted to threadably ride axially upon the threaded rod.

2. The steering column apparatus set forth in claim 1, wherein the shuttle is pivotally connected to the lower jacket at a first pivot axis, and is pivotally connected to the sliding structure at a second pivot axis spaced radially from the first pivot axis.

3. The steering column apparatus set forth in claim 1, wherein the steering axis and the stow axis are parallel to one-another.

4. The steering column apparatus set forth in claim 1, wherein the steering axis and the stow axis are angled with respect to one-another.

5. The steering column apparatus set forth in claim 1, further comprising:
an energy absorbing component coupled between the upper and lower jackets.

* * * * *